United States Patent [19]
Jackovitz et al.

[11] 3,899,350
[45] Aug. 12, 1975

[54] METHOD OF PREPARING HIGH CAPACITY NICKEL ELECTRODE POWDER

[75] Inventors: John F. Jackovitz, Monroeville; Earl A. Pantier, Verona, both of Pa.

[73] Assignee: Westinghouse Electric Corporation, Pittsburgh, Pa.

[22] Filed: Nov. 20, 1972

[21] Appl. No.: 308,087

[52] U.S. Cl. .................................... 136/29; 136/76
[51] Int. Cl. ........................................... H01m 43/04
[58] Field of Search ................................. 136/28–29, 136/75–76, 24, 25, 30, 31, 78, 34; 423/592, 594, 144, 395; 75/108, 109

[56] References Cited
UNITED STATES PATENTS

| | | | |
|---|---|---|---|
| 704,306 | 7/1902 | Edison | 136/28 |
| 1,079,346 | 11/1913 | Hubbell | 136/29 |
| 3,066,178 | 11/1962 | Winkler | 136/24 |
| 3,076,860 | 2/1963 | Dickfeldt | 136/24 |
| 3,108,910 | 10/1963 | Herold | 136/29 |
| 3,436,267 | 4/1969 | Faber | 136/29 |
| 3,579,385 | 5/1971 | Feduska et al. | 136/75 |
| 3,600,227 | 8/1971 | Hardman | 136/76 |
| 3,684,441 | 8/1972 | Faber | 423/592 |
| 3,702,019 | 11/1972 | Pollack | 136/75 X |
| 3,725,129 | 4/1973 | Ruzzo, Jr. | 136/29 |

*Primary Examiner*—Anthony Skapars
*Attorney, Agent, or Firm*—D. P. Cillo

[57] ABSTRACT

An electrode plate is made by loading a metallic plaque with active battery material comprising the reaction product of a starting material comprising Ni(II) hydroxide, and effective amounts of halogen, reacted in a caustic hydroxide solution, the reaction product containing about 75 to 95 weight % Ni(II) hydroxide and about 5 to 25 wt.% Ni(III) hydroxide.

8 Claims, 2 Drawing Figures

METHOD OF PREPARING HIGH CAPACITY NICKEL ELECTRODE POWDER

BACKGROUND OF THE INVENTION

Presently used methods for the preparation of nickel active battery material involve chemical precipitation or electrochemical precipitation of divalent nickel (II) hydroxide, as taught for example by Feduska et al in U.S. Pat. No. 3,579,385 and Hardman in U.S. Pat. No. 3,600,227. The usual procedure in making a battery plate involves loading the divalent nickel (II) hydroxide into a porous plaque, with oxidation of the material in the plaque to form a trivalent nickel (III) hydroxide. This is accomplished by electrochemical charging and discharging formation of the loaded plaque in an alkaline electrolyte, prior to introduction of the plaque into a battery.

Faber, in U.S. Pat. No. 3,436,267, converted directly to trivalent Ni(III) hydroxide battery material, by 100% oxidation of finely divided Ni(II) hydroxide power in a gas stream containing ozone. He then pasted this material into an electrode plaque. Faber indicates that his ozone treatment is an improvement over other methods attempting to 100% oxidize Ni(II) hydroxide, such as, oxidation of dry Ni(II) hydroxide with chlorine gas, as taught by Edison in U.S. Pat. No. 684,205, or oxidation of Ni(II) hydroxide in an aqueous alkaline medium with chlorine gas or bromine water. Faber's ozone treatment results in substantially 100% conversion to Ni(III) hydroxide without side reactions or contamination of the battery material.

Heretofore, the 100% oxidized, higher valent nickel-(III) hydroxide had been sought, by Faber and others in the battery art, as the most effective active battery material form. The Ni(III) form would provide capacity values of from about 0.15 to 0.20 Amp-hr/gr., after about 30 charge and discharge formation cycles i.e., about 60% of the theoretical nickel capacity based on single electron transfer per nickel atom. No one had recognized that a particular ratio of oxidized to unoxidized Ni hydroxide would provide a superior battery material.

With the increasing importance of improved batteries as a clean power source, especially in the transportation area, there is a need for super optimized active materials, that will provide capacities closer to the theoretical limits than heretofore possible.

SUMMARY OF THE INVENTION

We have discovered a process that will provide an optimum activated battery material mixture, by reacting a starting material containing Ni(II) hydroxide with effective amounts of halogen in a caustic hydroxide solution, to form a reaction product containing about 75 to 95 wt.% Ni(II) hydroxide and about 5 to 25 wt.% Ni-(III) hydroxide forms. The nickel hydroxide, preferably, will also contain small effective amounts of cobalt additive. When cobalt is used up to about 12 wt.%, the reaction product can effectively contain about 5 to 35 wt.% Ni(III) hydroxide forms.

This activated battery material can be loaded into a plaque to provide an electrode plate, which may then be electrochemically cycled or formed (electrically charged and discharged in an electrolyte) prior to use in a battery opposite a suitable negative electrode.

BRIEF DESCRIPTION OF THE DRAWINGS

For a better understanding of the invention, reference may be made to the preferred embodiments exemplary of the invention, shown in the accompanying drawings in which.

DESCRIPTION OF THE PREFERRED EMBODIMENTS

One embodiment of a battery, utilizing the improved electrode plate of the invention, would generally comprise a plurality of alternating positive nickel plates and negative plates such as, for example, loaded iron active material plates, with plate separators between the positive and negative plates, all contacted by alkaline electrolyte and housed in a case having a cover, a vent, and positive and negative terminals.

Figure 1:
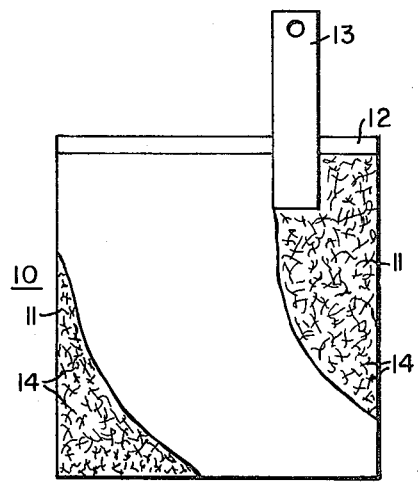
FIG. 1 shows a preferred electrode plaque loaded with the active battery material of this invention.

Preferred electrode plaques, shown in FIG. 1, are made from metal fibers, preferably nickel, or metal protective coated fibers, such as nickel coated steel or iron. The plaque 10, is a flexible, expansible, compacted sheet of relatively smooth, generally contacting, intermingled, metal fibers as shown at 11 in the body of the plaque. The plaque has, in the embodiment shown, top edge 12 coined to a high density. The coined area provides a base to which lead tab 13, which is attached to battery terminals, is spot welded. The plaque is preferably between 75 and 95 percent porous. Activated nickel electrode material is loaded into the interstices of the body of this fibrous plaque to provide an electrode plate. This invention can, however, be used with other metallic plaque structures.

The metal fibers are preferably diffusion bonded in a protective atmosphere at temperatures up to the melting point of the fibers used. In diffusion bonding, the fibers must not be melted, or protuberances will be formed reducing active material loading (volume) within the plaque. There should only be a metallurgical bond and interdiffusion of atoms across the fiber interface at fiber contact points 14 along the fiber lengths. Diffusion bonding provides a flexible, expansible electrode structure having a large pore volume into which active material can be pasted or otherwise impregnated. Diffusion bonding also lowers the electrode plate resistance appreciably and thus the internal cell resistance in a finished cell.

The body of active material can be prepared by reacting Ni(OH)$_2$ starting material, containing up to about 12 wt.% Co(OH)$_2$ or similar cobalt additive, with a halogen, such as bromine or chlorine, in a caustic hydroxide, such as sodium hydroxide, potassium hydroxide or the like. Since the caustic hydroxide is consumed during the reaction, it is essential that a sufficient quantity be present to insure that the desired degree of nickel (II) hydroxide oxidation is attained.

We have found, unexpectedly, that super optimized active battery material is formed when the reaction product is a particular mixture of reacted and unreacted nickel hydroxides, containing between about 75 to 95 wt.% Ni(OH)$_2$ and between about 5 to 25 wt.% Ni(OH)$_3$ or other form of nickel (III) hydroxide. This material provides superior capacity values even without the addition of cobalt additives. The reason why only a particular range of Ni(III) hydroxide gives such improved results is not completely understood at this time.

We have found that a small amount of cobalt addition provides an even further improved active battery material allowing more oxidation to higher nickel hydroxide forms, and results in electrodes which essentially give 0.5 Ah/sq. in. output. The cobalt may either alter electron mobility, stabilize the charged nickel powder or act as a catalyst or form new compounds with higher electrochemical activity than the undoped material.

In a typical experiment, 100 moles of $Ni(OH)_2$ is reacted with about 3.3 to 13.2 moles of halogen, such as bromine or chlorine, in an excess of alkali hydroxide to insure the desired completion of the reaction. One simple equation for the partial oxidation reaction can be given as:

$Ni(OH)_2 . Co(OH)_2 + 2KOH + Br_2 \rightarrow Ni(OH)_3 . Co(OH)_3 + 2KBr$ where the weight ratio of $Ni(OH)_2$ to $Co(OH)_2$ can be from 100 parts:0 parts to about 88 parts:12 parts. In the preferred method of this invention, the actual reaction product will contain about 5 to 35 wt.% nickel . cobalt (III) hydroxide and about 65 to 95 wt.% unoxidized nickel (II) hydroxide, cobalt being used as an additive to the nickel hydroxide starting material.

There is considerable speculation as to the precise formula of the higher valent, oxidized nickel (II) hydroxide i.e. it may be present as $Ni(OH)_3$, $NiOOH$, $NiO_2.H_2O$, $Ni_2O_3. 2H_2O$ or other as yet undetermined form. Applicants do not wish to be held to any particular theory, and for the purposes of this application the term nickel (III) hydroxide will be used to identify the higher valent state nickel compound obtained by reaction of $Ni(OH)_2$ with halogen in excess alkali hydroxide.

EXAMPLE 1

An electrode powder containing about 8 wt.% nickel (III) hydroxide and about 92 wt.% nickel (II) hydroxide was made by dissolving 40 grams of $NiCl_2 . 6H_2O$ in water and adding about 45 ml. of 45 wt.% KOH solution to form a precipitate of $Ni(OH)_2$. The precipitate was separated using a conventional Buchner apparatus. The precipitate was then washed with distilled water to remove residual chloride. Oxidation of the fresh $Ni(OH)_2$ was accomplished by stirring the $Ni(OH)_2$ precipitate into about 45 ml. of 45 wt.% KOH solution, followed by dropwise addition of 1.1 grams of elemental bromine, which converted the green emulsion to a finely divided crystalline black material which settled over a short period.

The reaction product was then separated using a conventional Buchner apparatus. After successive washings with distilled water, the precipitate was dried at room temperature. The precipitate powder contained a mixture of partially oxidized hydroxides containing about 8 wt.% nickel (III) hydroxide and about 92 wt.% nickel (II) hydroxide, as determined by iodine-thiosulfate titration.

A 0.213 gram sample of the above material was dissolved in 50 ml. of a colorless solution containing 0.20 molar hydrochloric acid containing 2.0 wt.% potassium iodide. The Ni(III) hydroxide liberated tri-iodide which turned the solution brown. The liberated tri-iodide required 14.8 ml. of standardized 0.10 molar thiosulfate for complete titration back to a colorless solution, the amount of thiosulfate thus determining the amount of Ni(III) hydroxide via tri-iodide. This corresponded to a mixture containing 8 wt.% nickel (III) hydroxide and 92 wt.% nickel (II) hydroxide. The percentage of nickel in this sample was found to be 57 wt.% using the dimethylglyoxine gravometric technique.

EXAMPLE 2

An electrode powder was made as in EXAMPLE 1, except that 2.2 grams of elemental bromine was used to oxidize the $Ni(OH)_2$. The resulting precipitate powder contained a mixture of about 16 wt.% nickel (III) hydroxide and about 84 wt.% nickel (II) hydroxide, as determined by iodine-thiosulfate titration.

EXAMPLE 3

An electrode powder was made as in EXAMPLE 1, except that 3.4 grams of elemental bromine was used to oxidize the $Ni(OH)_2$. The resulting precipitate powder contained a mixture of about 25 wt.% nickel (III) hydroxide and about 75 wt.% nickel (II) hydroxide, as determined by iodine-thiosulfate titration.

EXAMPLE 4

An electrode powder was made as in EXAMPLE 1, except that 6.8 grams of elemental bromine was used to oxidize the $Ni(OH)_2$. The resulting precipitate powder contained a mixture of about 50 wt.% nickel (III) hydroxide and about 50 wt.% nickel (II) hydroxide, as determined by iodine-thiosulfate titration.

EXAMPLE 5

An electrode powder was made as in EXAMPLE 1, except that 0.126 grams of elemental bromine was used to oxidize the $Ni(OH)_2$. The resulting precipitate powder contained a mixture of about 1 wt.% nickel (III) hydroxide and about 99 wt.% nickel (II) hydroxide, as determined by iodine-thiosulfate titration.

EXAMPLE 6

An electrode powder was made as in EXAMPLE 1, except that 13.6 grams of elemental bromine was used to oxidize the $Ni(OH)_2$. The resulting precipitate powder contained essentially 100% nickel (III) hydroxide, as determined by iodine-thiosulfate titration.

EXAMPLE 7

An electrode powder containing about 25 wt.% nickel (III) hydroxide . cobalt (III) hydroxide having a ratio of 95 wt.% nickel to 5 wt.% cobalt, and about 75 wt.% nickel (II) hydroxide . cobalt (II) hydroxide, was made by dissolving 38.50 grams of $NiCl_2.6H_2O$ and 2.38 grams of $CoCl_2 . 6H_2O$ in water and adding 47 ml. of 45 wt.% KOH solution, to form a precipitate of $Ni(OH)_2 . Co(OH)_2$. The Ni:Co wt.% ratio was 95:5. The precipitate was separated using a conventional Buchner apparatus. The precipitate was then washed with distilled water to remove residual chloride. Oxidation of the fresh $Ni(OH)_2 . Co(OH)_2$ was accomplished by stirring the $Ni(OH)_2 . Co(OH)_2$ precipitate into about 75 ml. of 10 wt.% KOH solution, followed by dropwise addition of 3.2 grams of elemental bromine, which converted the green emulsion to a finely divided crystalline black material which settled over a short period.

The reaction product was then separated using a conventional Buchner apparatus. After successive washings with distilled water, the precipitate was dried at room temperature. The precipitate powder contained a mixture of about 25 wt.% nickel (III) hydroxide . cobalt (III) hydroxide, as determined by iodine-thiosulfate titration. It had a Ni:Co wt.% ratio of about 95:5, and about 75 wt.% nickel (II) hydroxide . cobalt (II) hydroxide having a Ni:Co wt.% ratio of about 95:5.

EXAMPLE 8

An electrode powder was made as in EXAMPLE 7, except that 1.43 grams of $CoCl_2 \cdot 6H_2O$ was used. The resulting precipitate powder contained a mixture of about 25 wt.% nickel (III) hydroxide . cobalt (III) hydroxide, as determined by iodine-thiosulfate titration. It had a Ni:Co wt.% ratio of about 97:3, and about 75 wt.% nickel (II) hydroxide . cobalt (II) hydroxide having a Ni:Co wt.% ratio of about 97:3.

EXAMPLE 9

An electrode powder was made as in EXAMPLE 7, except that 4.76 grams of $CoCl_2 \cdot 6H_2O$ was used. The resulting precipitate powder contained a mixture of about 25 wt.% nickel (III) hydroxide . cobalt (III) hydroxide, as determined by iodine-thiosulfate titration. It had a Ni:Co wt.% ratio of about 90:10, and about 75 wt.% nickel (II) hydroxide . cobalt (II) hydroxide having a Ni:Co wt.% ratio of about 90:10.

EXAMPLE 10

For comparative purposes three more electrode powders were made, containing essentially 100 wt.% nickel (III) hydroxide, by dissolving 40 grams of $NiCl_2 \cdot 6H_2O$ in water and adding 45 ml. of 45 wt.% KOH solution to form a precipitate of $Ni(OH)_2$. The precipitate was separated using a conventional Buchner apparatus. The precipitate was then washed with distilled water to remove residual chloride. Oxidation of the fresh $Ni(OH)_2$ was accomplished by reacting it with excess sodium hypochlorite, potassium persulfate, and hydrogen peroxide in 45 wt.% KOH solution. In each case the precipitate powder was calculated to contain about 100 wt.% nickel (III) hydroxide.

In all cases, 100 mil thick diffusion bonded nickel fiber plaques, having an area of about 1 sq. in., were loaded with the electrode powders of EXAMPLES 1 through 10, using a conventional suction platform. An aqueous slurry of the nickel hydroxide active materials of EXAMPLES 1 through 10 were added dropwise from a blender until the plaques were filled. Additional active material in each case was pasted onto the surface of the plaques to insure a more complete loading without excess surface packing. Additional water was dropped onto the loaded electrode plates from a funnel to obtain optimum packing within the plaque support. All electrodes were then pressed at about 4000 lb/in$^2$, to a final thickness approximating 80 mils. The loading in each plaque was about 1.5 to 1.8 grams/sq.in. of plaque surface area.

The nickel hydroxide electrodes prepared from the electrode powders of EXAMPLES 1 through 10 were set opposite negative electrodes in a container, and contacted with electrolyte to form electrochemical cells. The nickel hydroxide electrodes were formed i.e. charge and discharge cycled versus sintered cadmium electrodes of considerably larger size and capacity.

They were charged at a current density of 0.5 amp/sq.in. in 31 wt.% aqueous KOH and discharged through a 10 ohm resistor at a current density of approximately 17 MA/sq. cm. in 31 wt.% aqueous KOH electrolyte. The amount of charge for each cycle was adjusted to 250% of the theoretical nickel capacity based on a single electron transfer per nickel atom.

The cycling increases the porosity of the electrode, allowing increased electrolyte penetration and higher output. Initially, the active material is tightly packed and the electrolyte is restricted from contacting the interior of the electrode. An electrode is ready for use after forming for about 10 to 45 cycles.

Figure 2:
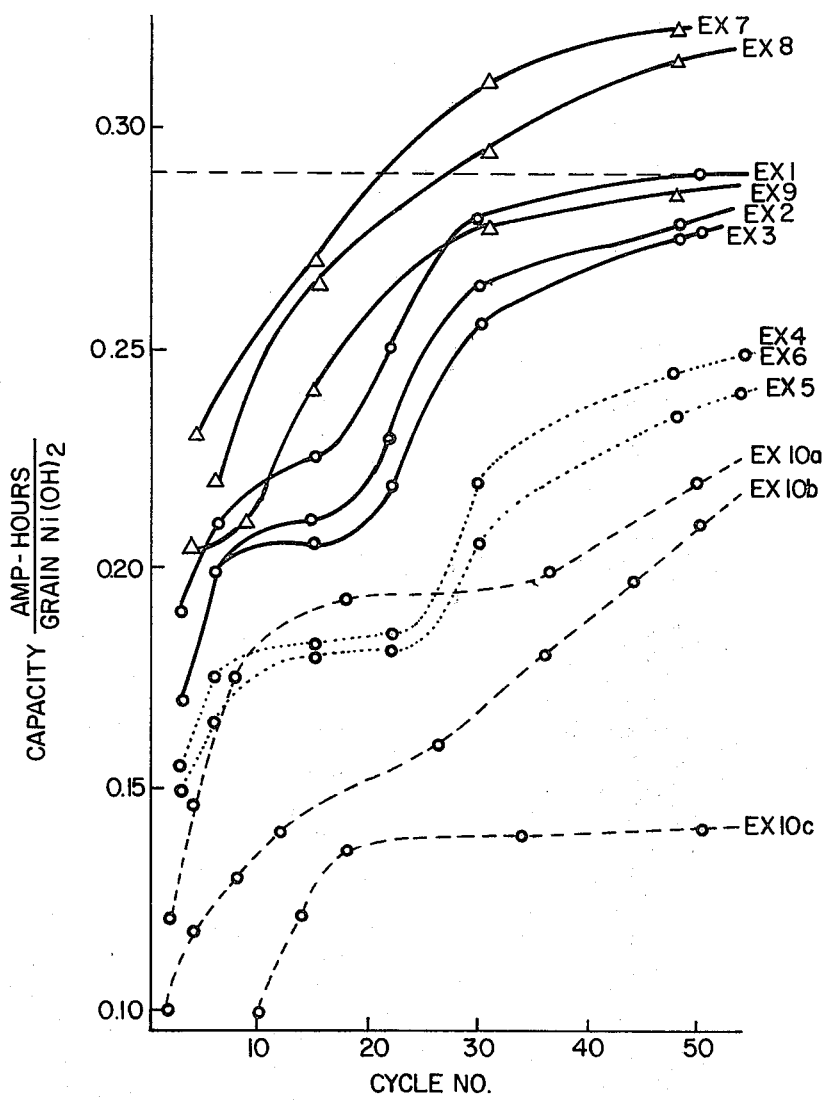
FIG. 2 is a graph showing the comparative performance of each of the 10 Example nickel electrode plates, in terms of capacity versus cycle number, in relation to theoretical capacity values.

The effect of the degree of oxidation on the electrochemical capacity of the precipitate powders in terms of ampere-hours per gram of $Ni(OH)_2$ or $Ni(OH)_2 \cdot Co(OH)_2$ is shown in FIG. 2 of the drawings. A parallel set of experiments using commercially available $Ni(OH)_2$ showed very similar results.

The test data is shown in FIG. 2 and Table 1:

TABLE 1

| Electrode Plate-Example | % Oxidation to Ni(III)hydroxide | Ni:Co wt.% ratio | Oxidizing Agent | Capacity Amp-hr at gram Ni(OH)$_2$* Cycle No. | | |
|---|---|---|---|---|---|---|
| | | | | 15 | 30 | 50 |
| 1 | 8 | 100:0 | Br$_2$ | .225 | .280 | .290 |
| 2 | 16 | 100:0 | Br$_2$ | .210 | .260 | .280 |
| 3 | 25 | 100:0 | Br$_2$ | .205 | .255 | .275 |
| 4 | 50 | 100:0 | Br$_2$ | .185 | .220 | .245 |
| 5 | 1 | 100:0 | Br$_2$ | .180 | .205 | .235 |
| 6 | 100 | 100:0 | Br$_2$ | .185 | .220 | .245 |
| 7 | 25 | 95:5 | Br$_2$ | .270 | .310 | .320 |
| 8 | 25 | 97:3 | Br$_2$ | .265 | .295 | .315 |
| 9 | 25 | 90:10 | Br$_2$ | .240 | .280 | .285 |
| 10a | 100 | 100:0 | NaClO | .185 | .190 | .220 |
| 10b | 100 | 100:0 | K$_2$S$_2$O$_8$ | .145 | .170 | .210 |
| 10c | 100 | 100:0 | H$_2$O$_2$ | .130 | .140 | .140 |

*or gram Ni(OH)$_2$ · Co(OH)$_2$

Capacity values which we considered acceptable for super-optimized nickel hydroxide battery material were over 0.20 amp-hr/gr. after 15 cycles, 0.235 amp-hr/gr. after 30 cycles and 0.255 amp-hr/gr. after 50 cycles. This would provide an active battery material highly effective in approaching theoretical values and much improved over prior art materials.

Theoretical values for one-electron transfer, at 0.29 amp-hr/gr., are shown on FIG. 2 as a broken horizontal line. On the graph of FIG. 2, non-optimized values are shown as black circles and curves as dotted (Br$_2$ oxidizing agent) or broken (NaClO, K$_2$S$_2$O$_8$ or H$_2$O$_2$ oxidizing agents) lines, whereas super-optimized values are shown as open circles (0 wt.% cobalt) or open triangles (3–10 wt.% cobalt) and curves as solid lines. The example number for each curve is indicated on the right hand side of FIG. 2.

As shown, the best electrochemical performance without an additive is obtained when about 8 wt.% of the Ni(OH)$_2$ is oxidized (curve 1). Very acceptable performance is obtained when 16 wt.% and 25 wt.% higher valent oxide is present in the initial active material (curves 2 and 3). A 100 wt.% oxidized material behaves similarly to the 50 wt.% oxidized material (curves 4 and 6). An optimum range of oxidation would be between about 5–25 wt.% nickel (III) hydroxide in the active battery material when cobalt additive is not used. Of course, the ability of an active material to provide such excellent capacity values without an additive would provide a definite cost savings.

A striking improvement occurs in electrode performance when about 3–10 wt.% cobalt hydroxide is added to the nickel powder (curves 7, 8 and 9). Zero cobalt addition would correspond to curve 3, containing 25 wt.% nickel (III) hydroxide. As can be seen from FIG. 2, when cobalt additive is used, the percentage oxidation of Ni(II) hydroxide to Ni(III) hydroxide can be increased, and the effective oxidation range broadened to about 5 to 35 wt.% Ni(III) hydroxide in the final electrode powder. A curve for active material containing about 35 wt.% Ni(III) and having a wt.% ratio Ni:Co of about 95:5 would correspond to curve 3.

An optimum wt.% ratio of nickel to cobalt would be between about 100:0 to 88:12. The addition of cobalt can increase utilization up to 30% over non-cobalt materials. The test data is limited to about 50 cycles since improvements in materials are usually evident at that point.

The effect of "over-oxidation" of $Ni(OH)_2$ has been demonstrated using $Br_2$ and other oxidants to provide 50–100 wt.% nickel (III) hydroxide in the active battery material (curves 4, 5 and the three curves of FIG. 10). The effect of the "over-oxidation" sought in the prior art is most evident between the 10th and 30th formation cycles, where capacity values lag behind the optimized materials of this invention and never recover.

The optimized battery material of this invention can also be prepared by $Cl_2$ oxidation and would most probably offer a significant cost savings.

Batteries prepared from the optimized positive nickel plates of this invention and negative plates such as cadmium or iron should provide an efficient high output power source.

We claim:

1. A method of producing active battery material for use in an electrode plate by (a) providing a starting material consisting essentially of $Ni(OH)_2$ (b) chemically oxidizing 5 to 25 percent of the starting material by chemically reacting it with halogen in a caustic hydroxide solution, wherein about 3.3–13.2 moles of halogen is reacted per 100 moles of $Ni(OH)_2$, forming an active material comprising between 75 to 95 weight percent $Ni(OH)_2$ and between 5 to 25 weight percent Ni(III) hydroxide.

2. The method of claim 1 wherein the caustic hydroxide is selected from the group consisting of NaOH and KOH, and the halogen is selected from the group consisting of bromine and chlorine.

3. The method of claim 2 wherein the active material is loaded into an electrode plate which is then electrically charged and discharged in an electrolyte.

4. A method of producing active battery material for use in an electrode plate by (a) providing a starting material consisting essentially of $Ni(OH)_2.Co(OH)_2$, wherein the starting material contains from about 3–12 wt.% $Co(OH)_2$, (b) stirring the starting material into a caustic hydroxide solution, and (c) chemically oxidizing 5 to 25 percent of the starting material by reacting with halogen with the starting material-caustic solution, wherein about 3.3–13.2 moles of halogen is reacted per 100 moles of $Ni(OH)_2.Co(OH)_2$, forming an active material chemical reaction product comprising about 75 to 95 weight percent $Ni(OH)_2.Co(OH)_2$ and about 5 to 25 weight percent Ni(III) hydroxide.cobalt (III) hydroxide.

5. The method of claim 4, wherein the weight ratio of $Co(OH)_2$ to $Ni(OH)_2$ in the starting material is between about 3 parts: 97 parts to 5 parts: 95 parts.

6. The method of claim 4 wherein the caustic hydroxide is selected from the group consisting of NaOH and KOH, and the halogen is selected from the group consisting of bromine and chlorine.

7. The method of claim 5 wherein the active material is loaded into an electrode plate which is then electrically charged and discharged in an electrolyte.

8. A method of producing active battery material for use in an electrode plate by (a) providing a starting material consisting essentially of $Ni(OH)_2.Co(OH)_2$, wherein the weight ratio of $Co(OH)_2$ to $Ni(OH)_2$ is between about 3 parts $Co(OH)_2$:97 parts $Ni(OH)_2$ to 12 parts $Co(OH)_2$:88 parts $Ni(OH)_2$, (b) stirring the starting material into a caustic hydroxide solution, (c) chemically oxidizing 5 to 35 percent of the starting material by adding halogen selected from the group consisting of bromine and chlorine to the starting material-caustic solution in an effective amount in an excess of caustic hydroxide solution forming an active material comprising about 65 to 95 weight percent unreacted $Ni(OH)_2.Co(OH)_2$ and about 5 to 35 weight percent reacted oxidized material having an apparent formula of Ni(III) hydroxide.Co(III) hydroxide, wherein the weight ratio of $Co(OH)_2$ to $Ni(OH)_2$ is between about 3 parts $Co(OH)_2$:97 parts $Ni(OH)_2$ to 12 parts $Co(OH)_2$:88 parts $Ni(OH)_2$ and the weight ratio of Co(III) hydroxide to Ni(III) hydroxide is between about 3 parts Co(III) hydroxide:97 parts Ni(III) hydroxide to 12 parts Co(III) hydroxide:88 parts Ni(III) hydroxide and, (d) washing and drying the active material.

* * * * *